(12) United States Patent
Baldanza et al.

(10) Patent No.: US 8,151,971 B2
(45) Date of Patent: Apr. 10, 2012

(54) DEVICE FOR FORMING A CONTINUOUS FLOW OF ORIENTED PRODUCTS

(75) Inventors: Nicola Baldanza, Bologna (IT); Giordano Gorrieri, Bologna (IT); Nicola Giuliani, Bologna (IT)

(73) Assignee: KPL Packaging S.p.A., Calderara di Reno, Bologna (IT)

( * ) Notice: Subject to any disclaimer, the term of this patent is extended or adjusted under 35 U.S.C. 154(b) by 531 days.

(21) Appl. No.: 12/225,366

(22) PCT Filed: Mar. 16, 2007

(86) PCT No.: PCT/IT2007/000191
§ 371 (c)(1),
(2), (4) Date: Dec. 8, 2008

(87) PCT Pub. No.: WO2007/108032
PCT Pub. Date: Sep. 27, 2007

(65) Prior Publication Data
US 2009/0166154 A1     Jul. 2, 2009

(30) Foreign Application Priority Data
Mar. 20, 2006   (IT) .............................. BO2006A0194

(51) Int. Cl.
*B65G 47/30* (2006.01)
(52) U.S. Cl. ...................... 198/418.5; 198/408; 198/411
(58) Field of Classification Search .................. 198/408, 198/626.1, 626.2, 626.3, 861.1, 586, 369.7, 198/594, 812, 432, 413, 802, 836.3, 836.4, 198/817, 478.1, 418.5, 377.02, 384, 404
See application file for complete search history.

(56) References Cited

U.S. PATENT DOCUMENTS

| | | | | |
|---|---|---|---|---|
| 2,497,767 A * | 2/1950 | Hallead | ......................... | 198/408 |
| 2,645,326 A * | 7/1953 | Kerr | ........................... | 198/418.1 |
| 2,940,579 A * | 6/1960 | Murphy | ........................ | 53/497 |
| 3,220,532 A * | 11/1965 | Vamvakas | ..................... | 198/408 |
| 3,346,094 A * | 10/1967 | Vamyakas | ..................... | 198/408 |
| 3,729,085 A * | 4/1973 | Schlueter et al. | .......... | 198/418.1 |
| 3,901,166 A * | 8/1975 | Morandi et al. | ............. | 198/411 |
| 4,079,644 A * | 3/1978 | Hoke et al. | ........................ | 83/88 |
| 4,360,098 A * | 11/1982 | Nordstrom | ................. | 198/418.1 |
| 4,754,867 A * | 7/1988 | De Anda | .................... | 198/464.2 |
| 4,928,809 A * | 5/1990 | Bozza | ........................... | 198/408 |
| 5,040,662 A * | 8/1991 | Clark et al. | .................... | 198/408 |
| 5,555,968 A * | 9/1996 | Seefeldt et al. | ............... | 198/594 |
| 5,966,901 A * | 10/1999 | Komp et al. | ................. | 53/387.2 |

(Continued)

FOREIGN PATENT DOCUMENTS
EP     0 654 429 A1   5/1995
(Continued)

*Primary Examiner* — Gene Crawford
*Assistant Examiner* — William R Harp
(74) *Attorney, Agent, or Firm* — Breiner & Breiner, LLC

(57) ABSTRACT

An apparatus or device is described for forming a continuous and cadenced flow of groups of rolls of paper or other products, coming from the production line or from pre-packaging lines, and rotated by a carousel with horizontal shaft of rotation. The carousel is provided with the blades of L-shaped stalls which pass cyclically and in the right phase between and underneath pairs of supports, to raise the products positioned thereon and set them on a horizontal conveyor. The stalls are controlled to rotate with respect to the carousel in a direction opposite the direction of rotation of the carousel to avoid interference with the products once the products are placed on the horizontal conveyor.

26 Claims, 6 Drawing Sheets

U.S. PATENT DOCUMENTS 5,979,634 A * 11/1999 Odegard et al. ............... 198/408
6,054,665 A *  4/2000 Focke et al. .................. 209/576
6,415,903 B1    7/2002 Zinno et al.
7,506,486 B2 *  3/2009 Wegner et al. ................. 53/167

FOREIGN PATENT DOCUMENTS

EP          1052173  A1 * 11/2000

* cited by examiner

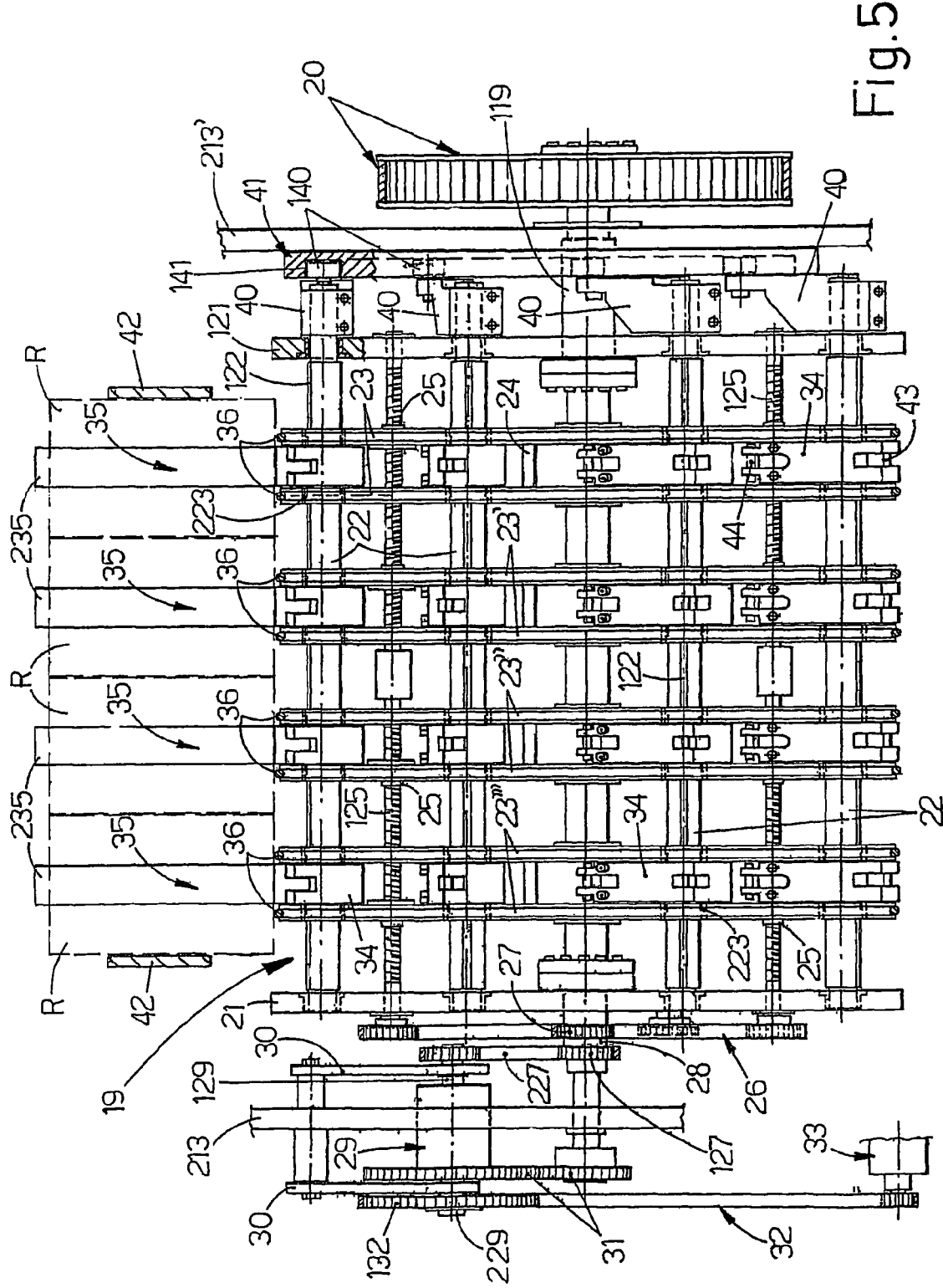

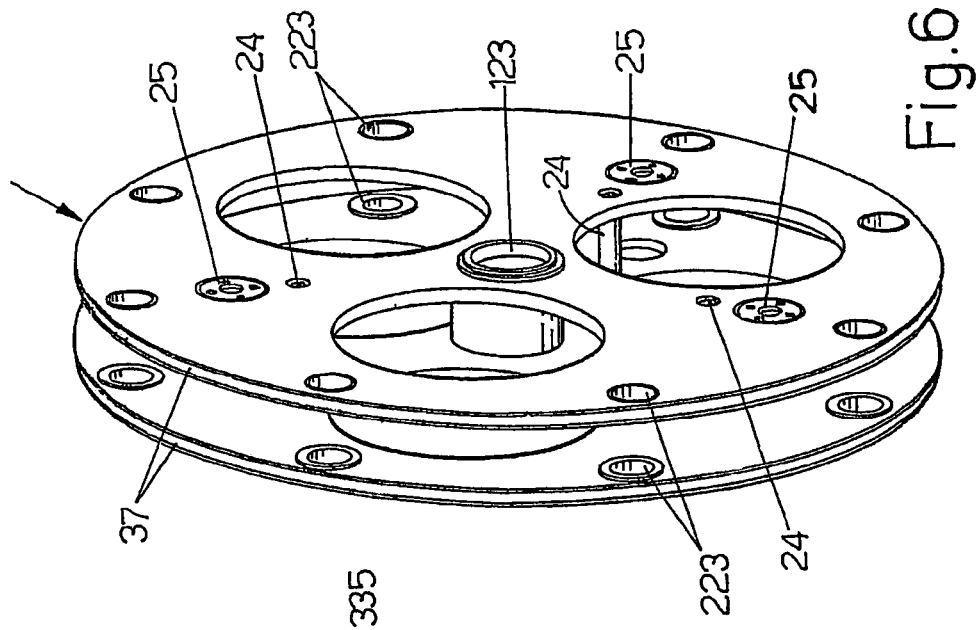
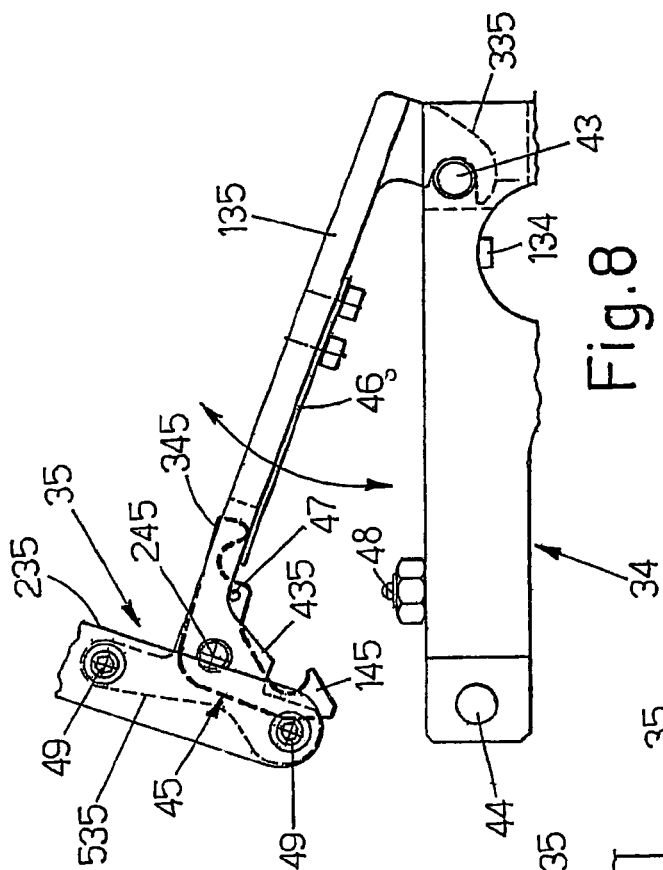
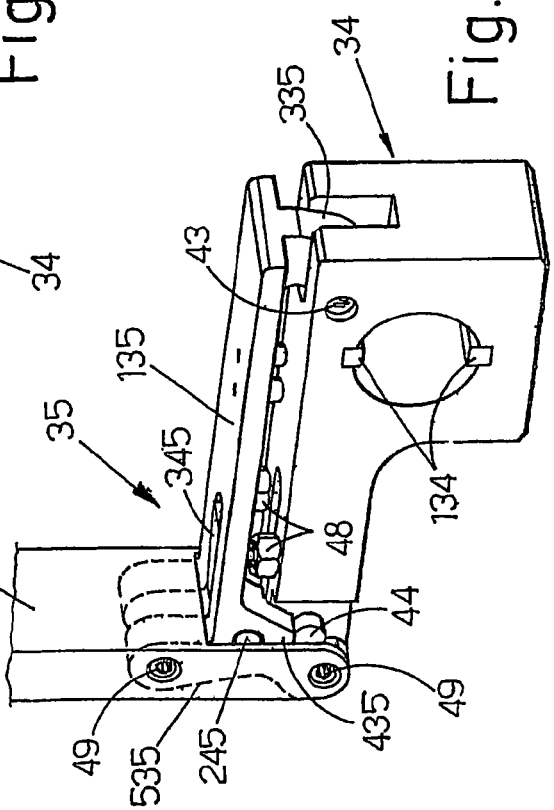

DEVICE FOR FORMING A CONTINUOUS FLOW OF ORIENTED PRODUCTS

FIELD OF THE INVENTION

The invention relates to an apparatus or device that is particularly suitable for forming a continuous and cadenced flow of groups of rolls of toilet paper or of hand towels or kitchen wipes, coming from the log-saw line, and hence single, or coming from packaging machines, such as pre-packed articles of manufacture, to be fed with the right orientation to a continuous and high-production bag-filling machine, for example, of the type described in the European patent application No. EP 1.535.843 filed in the name of the present applicant or to any other machine arranged downstream.

BACKGROUND OF THE INVENTION

Currently, plants are known for feeding to a bag-filling machine groups of rolls of paper coming from a production line or from packaging lines. The rolls are usually arranged with their axes horizontally and in single file and in contact with one another. The rolls are rotated through ninety degrees about an axis that is horizontal and orthogonal thereto. The rotation is performed by a carousel with horizontal axis, equipped with blades of length correlated to the dimensions of the products to be treated, which pick up the rolls from the feed line and raise them, subjecting them to a rotation of 90° about the axis of said carousel, so as to set the rolls with a vertical axis and feed them in an upper station, where the rolls themselves are accumulated in a pre-set amount and then are moved away in the right phase by a pusher that operates parallel to the axis of the carousel or else by a pusher that operates with a movement orthogonal to the axis of said carousel and when this is moving, so as to eliminate any dead times.

This latter solution is suited for continuous-cycle operation but has speed limitations due to the friction of mutual detachment of the rolls when they are gripped by the blades of the raising carousel and to the friction between blades and rolls when the latter accumulate in the upper station, with the risk of being damaged or tipped over forwards by the thrust of said blades. Said blades are usually in a fixed radial position with respect to the carousel.

As an alternative to the above systems, the rolls, either single or pre-packaged and arranged with horizontally oriented axes, are caused to perform a descending movement by exerting a thrust and by gravity within guides shaped like the sector of a circle and having a curvature of ninety degrees, at the end of which the rolls are arranged with their axes set vertically and are moved away by a reciprocating pusher, which transfers them into an accumulation station, from which the groups of rolls are then moved away by continuous pushers, constituted, for example, by pusher cross members moved by parallel conveyors. Also this solution has limits due to the friction of mutual detachment of the rolls when they are moved away by the reciprocating pusher and limits due to the cyclic nature of operation of said pusher in so far as the flow of the rolls must stop both during the travel of the pusher forwards and during its return.

Consequently, the known art does not teach methods and apparatuses capable of handling the rolls delicately and pre-arranging them in a dynamic and fast way for feeding a continuous-operation and high-production bag-filling machine. The known art does not even teach solutions for a rapid adaptation of the means to the change of format of the products and to the number of the rows of said products that are to be treated each time.

OBJECTS AND SUMMARY OF THE INVENTION

The object of the invention is to solve or reduce at least some of the above drawbacks of the prior art machines.

According to one embodiment, the device includes: an advancement conveyor for feeding said products; downstream of said advancement conveyor, a carousel rotating on a substantially horizontal rotation shaft; an exit conveyor for receiving products from said carousel; wherein said carousel is provided with L-shaped stalls including blades arranged to cyclically pass between corresponding supports on which said products are fed by said advancement conveyor, in order to raise said products from said supports, rotate them and feed them to said exit conveyor; wherein said stalls are pivotally mounted on said carousel; and wherein said stalls are subject to a controlled oscillation with respect to said carousel such that, when said products are in a vertical position on said exit conveyor, the stalls are caused to oscillate backwards with respect to the carousel.

In an embodiment the device is suitable for rotating groups of rolls, such as tissue paper rolls by 90° around a substantially horizontal and transversal axis. The device can be designed to rotate incoming rolls, which are oriented with substantially horizontal axes arranged parallel to the advancement direction, such that they exit from the machine in an upwardly oriented position, i.e. with the axes of the rolls in a substantially or nearly vertical orientation.

In a preferred embodiment said supports are arranged in pairs, each pair of supports being aligned with a corresponding plurality of said stalls circumferentially arranged around said carousel. In an alternative embodiment a single support rather than a pair of supports is provided for each product. The support is shaped such that the stalls can pass with their projecting blades through a slot formed in the support.

In one embodiment, said carousel is divided into axially aligned sections, each section being provided with a set of circumferentially arranged stalls, and each section being aligned with respective supports for said products.

In one embodiment the exit conveyor includes a set of lower conveyor belts, such as for example pairs of conveyor belts, one pair for each line of parallel products, which are downloaded from said carousel. In a preferred embodiment the exit conveyor comprises a pair of substantially parallel and preferably substantially horizontal conveyor devices, arranged one on top of the other, the products being fed between said superposed conveyor devices and advancing in contact with said superposed conveyor devices. This embodiment is particularly suitable for handling rolls of paper. More stable products, such as packs of folded napkins or the like might be released on a lower conveyor and the upper conveyor can be dispensed with.

In one embodiment, said carousel supports a plurality of sets of said stalls, the stalls of each set being supported by a respective common shaft, said shafts co-acting with a control member, which controls the oscillation of said shafts. In a practical embodiment, said control member controls the oscillation of the shafts as a function of the angular displacement of said carousel. In a particularly advantageous embodiment, said control member includes a cam and follower arrangement. Preferably, a cam follower is provided for each one of a plurality of oscillating shafts arranged parallel to the rotation axis of said carousel and on each of which a plurality of said stalls are fitted, such as to oscillate integrally with said shaft around the axis of said shaft under the control of the cam follower. The cam follower runs along a cam profile, such as a cam profile in the shape of a channel, when the shaft to which said cam follower is connected rotates around the rotation axis of the carousel.

In one embodiment said stalls are replaceable as the format of the products to be treated varies. Similarly, said supports or pairs of supports can be replaceable as the format of the products to be treated varies. The format of the product can include for example one or more of the dimensions of the product, such as the diameter, the length, the width, or the height thereof, or the number of products simultaneously fed at each advancement step.

In one embodiment the carousel, said supports and said exit conveyor are mounted on a slider, which is movable on transverse guides in a direction substantially parallel to the axis of rotation of said carousel, to align circumferentially arranged stalls and corresponding supports for said products with a center line of said advancing conveyor.

According to one aspect, the invention provides a device for forming a continuous and cadenced flow of groups products, including: an advancement conveyor for feeding said products; downstream of said advancement conveyor, a carousel rotating on a substantially horizontal rotation shaft; an exit conveyor for receiving products from said carousel; wherein said carousel is provided with seats, for receiving said products fed by said advancement conveyor in order to raise said products, rotate them and feed them to said exit conveyor; wherein said seats are pivotally mounted on said carousel; and wherein said seats are subject to a controlled oscillation with respect to said carousel such that, when said products are in a vertical position on said exit conveyor, the seats are caused to oscillate with respect to said carousel in a direction opposite to the direction of rotation of said carousel. The oscillation of said seats is controlled as a function of the angular position of the carousel, such that when a product is transferred from the carousel to said exit conveyor the seat is controllably pivoted in a direction opposite the angular advancement of the carousel, avoiding an interference with the product. The product can thus be advanced smoothly along the exit conveyor without excessive accelerations being imparted to the product. This results in a smooth and careful handling of the products without reducing the overall output rate of the device.

In a preferred embodiment said seats or stalls are L-shaped, with a base and a blade projecting from said base, said products being lifted by said blade and being rotated to rest on said base whilst they are lifted by said rotating carousel towards said exit conveyor. In one embodiment the seats can be snap-fitted on appendages or guides oscillatingly supported by said carousel. Snap-fitting allows quick and easy replacement of the seats according to the product format.

Herein after reference will be specifically made to articles or products in the forms of individual or pre-packed rolls. However, as stated above, the machine according to the invention can be suitable to handle also different kind of items and articles of manufacture, especially tissue paper articles, whenever it is required to rotate them by 90° and feed them to a station or machine arranged downstream.

In an embodiment of the invention the rolls coming from the production line or from pre-packaging lines, are singularized, i.e. separated one from the other, and arranged alongside one another in the number envisaged, by a conveyor with pusher cross members, which feeds the rolls on pairs of parallel supports. Downstream of said supports is arranged a carousel with a horizontal rotation axis. Said carousel is provided with blades. Said blades move cyclically and in the right phase between and underneath said pairs of supports, to lift the product positioned thereon and to set it with its own axis vertically between a pair of substantially parallel conveyors, set above one another and extending horizontally.

In one embodiment, the lower conveyor is formed by the top branch of pairs of conveyor belts run over the circumference of said carousel and over parallel pulleys located downstream of said carousel. In one embodiment, the top conveyor is formed by pairs of belts, which are motor-driven at the same speed as the pairs of bottom conveyor belts.

In one embodiment, said raising blades are mounted on the carousel, with the possibility of oscillation by a lever arm that co-operates with a cam in such a way that, when the rolls are in a vertical position and already properly inserted between the conveyors set above one another, horizontal and parallel, said blades perform an oscillation backwards so as to disengage, without interference with the rolls raised by them that continue to be fed by said horizontal conveyors.

As the format of the products varies, means are provided for adjusting the distance of the conveyor that singularizes the rolls and sets them alongside one another from the pairs of supports from which the blades of the carousel lift the products, in order to replace the blades of the carousel rapidly, to adjust the distances between said pairs of supports and the blades of the carousel and the corresponding pairs of conveyor belts.

In one embodiment, the complex including the carousel, the pairs of supports and the corresponding pairs of conveyor belts, is mounted on a slide that is mobile on guides set horizontal and orthogonal to the flow of the rolls. Means are provided for enabling translation of said complex for the purpose of aligning the number of its active channels, whether this be even or odd, with the center line of the conveyor set upstream, on which the rows of rolls arranged alongside one another are centered. In one embodiment of the invention, the groups of rolls arranged alongside one another and cadenced that come off said complex, are grouped together even set one after the other in the pre-set amount, by means of at least one dosing device, by which said groups of rolls will be fed to the continuous bagging machine with the right cadence and in phase.

Further advantageous features of the invention are described here below with reference to one embodiment of a device according to the invention, and in the enclosed claims.

BRIEF DESCRIPTION OF THE DRAWINGS

Further features of the invention, and the advantages deriving therefrom, will appear more clearly from the ensuing description of a preferred embodiment thereof, illustrated purely by way of non-limiting example in the attached drawing, wherein:

FIGS. 2a and 2b are schematic top plan views that highlight the different alignment between the first components of the device in the case where the number of the rows of rolls fed is even or odd;

FIGS. 3, 4 and 5 are, respectively, a side elevation and with parts in cross section, a perspective view and an elevation from the front face where the product enters, of the carousel designed for rotation of the groups of rolls arranged alongside one another;

FIG. 6 illustrates in perspective a pair of disks of the carousel, illustrated in the previous figures, which perform the dual function of entrainment of a corresponding pair of conveyor belts and of support of the shafts for oscillation of the stalls for gripping and rotation of the rolls;

FIGS. 7 and 8 are views in perspective and in side elevation, respectively, of the stalls of the carousel, respectively installed on the corresponding supporting base and during fast installation on said corresponding supporting base or fast removal therefrom.

DETAILED DESCRIPTION OF AN EMBODIMENT OF THE INVENTION

Figure 1:
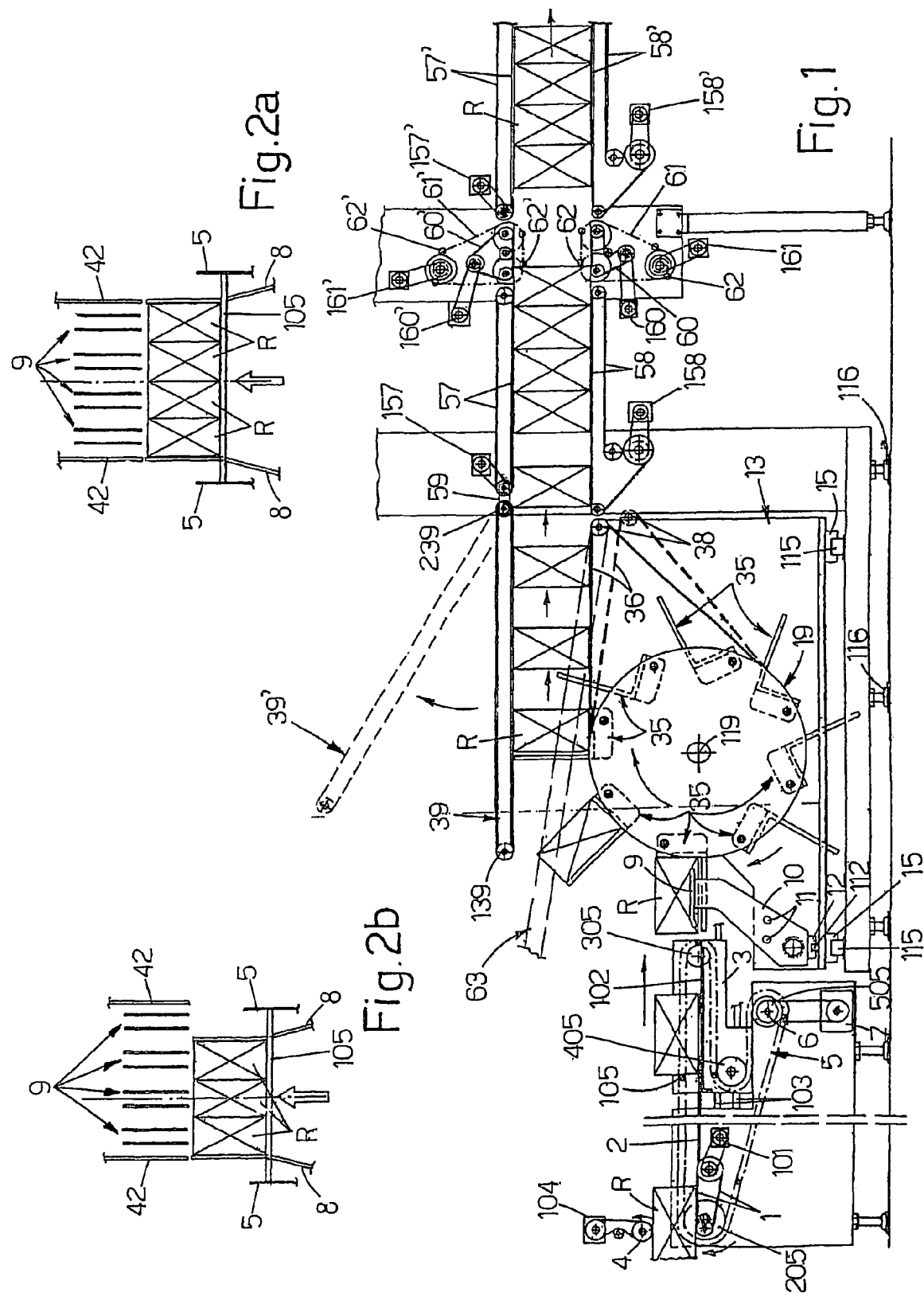
FIGS. 1 and 2 are schematic views, respectively in side elevation and in top plan view of the device according to an embodiment of the invention.
Figure 2:
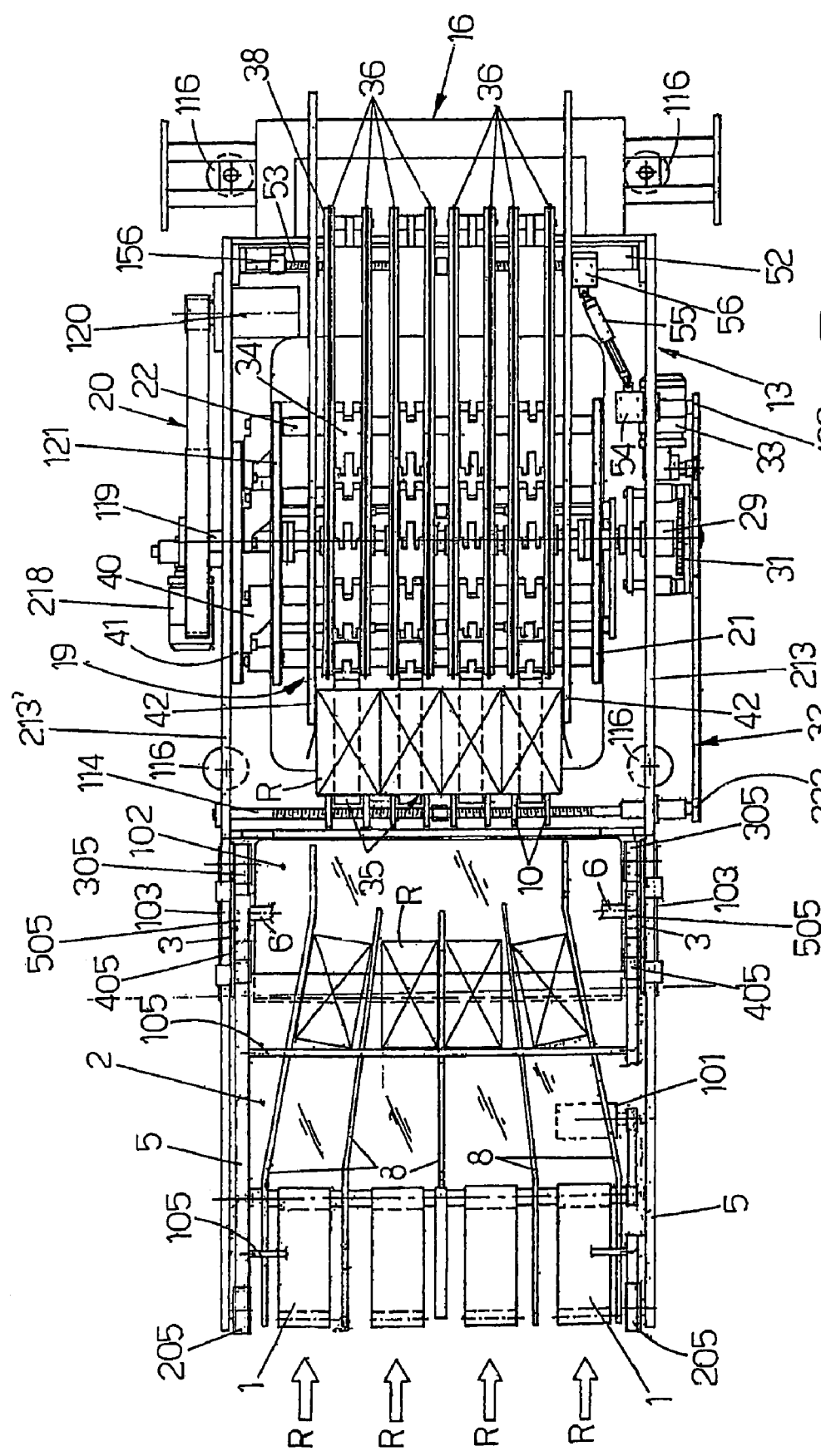

From FIGS. 1 and 2 it may be noted that the products to be treated can consist typically of rolls of paper R with horizontal axis, which arrive in single file from a log-saw machine usually with four conveying channels, downstream of which are provided launcher devices of a known type, formed, for example, by pairs of parallel conveyors with vertical axes, which cyclically unload one roll at a time, either simultaneously or in a staggered way. A number of rolls, such as paper rolls, cyclically exit from the set of said launchers, said rolls being placed with horizontal axes, arranged alongside one another. In one embodiment, said number of rolls exiting the set of launchers can be equal to or less than four.

Provided downstream of said feed assembly is the first component of the device according to the invention. Said device includes a horizontal surface for receiving the rolls, the upstream portion of which is formed by the top branch of a belt conveyor 1 or of four laterally arranged belt conveyors 1. Said belt conveyor or belt conveyors 1 are motor-driven by a motor 101 in the direction and with the appropriate speed for feeding the products in a forward motion. Downstream of said conveyor belt 1, said roll receiving surface is further formed by a horizontal surface, prearranged in such a way that said rolls can slide thereon with a limited friction, given that said surface. In some embodiments, said surface includes a fixed first portion 2 and a movable second portion 102. Said movable portion 102 can slide under the first portion and can project therefrom with a length that can vary as the format of the rolls to be treated varies. For said purpose the movable second portion 102 of said surface is fixed on a carriage 3, which, with appropriate adjustment means, can be made to slide on horizontal guides 103 aligned with respect to the direction of advance of the rolls.

Above the initial part of the belt conveyor or conveyors 1 and parallel to their first axis of entrainment, a roller 4 or some other suitable conveying means is provided, which is actuated by a motor 104. The distance between said roller 4, or other suitable conveying means, and the underlying conveyor or conveyors 1 can be adjusted with suitable means, for adapting to rolls of different format, which, by the combined and synchronized action of these bottom conveying means 1 and top conveying means 4, are made to advance in the direction of the surface 2.

Whilst advancing in the direction of the surface 2, before the rear face of the rolls abandons the conveyor or conveyors 1, said rolls are in the right phase reached by a pusher. In one embodiment, said pusher is one of a plurality of pusher cross members 105 of an endless conveyor, such as a conveyor formed by two parallel and endless chains or toothed belts 5, arranged sideways of the complex 1, 2, 102 and entrained on pairs of pinion wheels or pulleys 205, 305. In one embodiment the first of said pairs of pinion wheels or pulleys is in a static position, whilst the pair 305 is mounted on the carriage 3 that carries also the first pair of pulleys or pinion wheels 405 for entrainment of the bottom branch of said chains or toothed belts 5. The latter forms a zigzag path also as a result of the entrainment over a pair of pulleys 505 synchronized with one another by means of a shaft 6 connected to a motor drive 7.

It is clear from the above that by adjusting the longitudinal position of the carriage 3 the tension of the chains or belts 5 will remain unvaried and that, together with the length of the projecting part of the surface portion 102, also the length of said chains or belts 5 varies, the top branch of said chains or belts 5 traveling at a height appropriately greater than the one at which the complex 1, 2, 102 is operating. In this way the pusher cross members 105 will act on a sufficiently wide part of the rear face of the rolls R.

The rolls fed by the means set upstream are picked up by the pusher cross members 105 and as they move along the surface of sliding 2, 102, they are arranged alongside one another in mutual contact by the action of adjustable guides 8 (see FIG. 2). Said guides 8 terminate with a shape that is parallel and always centered with respect to the longitudinal middle axis, i.e. the center line, of said surface of sliding 2, 102.

Said rolls R can be individual rolls or pre-packaged rolls. In the latter case they are fed in phase to the above-described device by conveyors entrained around rollers with horizontal axes and which are set above one another and motor-driven in a synchronous way. Said conveyors are known per se and are not described in detail herein.

From FIGS. 1, 2, 3 and 4 it may be noted that the rolls R, unloaded by the pusher cross members 105 of the chains or belts conveyors 5, are placed with the right deceleration on pairs of supports 9 that can be interchanged according to the format of the products to be handled and are mounted with substantially horizontal arrangement and with the possibility of fast fixing and removal, on the top of four pairs of arms 10. In one embodiment, the two arms 10 of each pair of arms are connected to one another by cross members 11. Furthermore, said arms 10 are equipped, at the bottom, with small slides 12 that slide on a horizontal rectilinear guide 112, orthogonal to the flow of the rolls and fixed on the bottom 113 of a machine-bed structure or frame 13 said structure or frame 13 carries a carousel 19 (described in greater detail in what follows) for raising the rolls R and rotating them through ninety degrees.

In one embodiment, each pair of arms 10 is equipped with nut screws 14 that co-operate with a screw 114 having right-hand and left-hand threads. In one embodiment said threads have differentiated pitches. Said screw 114 is rotatably supported at the ends by side walls 213, 213' of the frame 13. By means of said screw it is possible to adjust the distance between the pairs of supports 9 in a self-centering way with respect to the longitudinal middle axis of said frame 13, to adapt said distance to the diameter of the rolls R to be treated and to cause said rolls to be in substantial lateral contact with one another when they arrive on the supports 9.

If the rows of rolls that come off the first feed unit are in even number, for example, four (or two), as illustrated, for example, in FIG. 2a, the median longitudinal axis of said first feed unit is aligned to that of the frame 13, so that all four pairs of supports 9 (or only the two central pairs) operate. If, instead, from the first feed unit there exits an odd number of rows of rolls, for example, three (or one), as illustrated in the example of FIG. 2b, means are provided for translating the frame 13 in a direction transverse to the flow of the rolls, for aligning the median axis of one of the two intermediate pairs of supports 9 to the longitudinal middle axis of said first feed unit, so that one pair (or three pairs) of said supports is (are) not operative.

Figure 3:
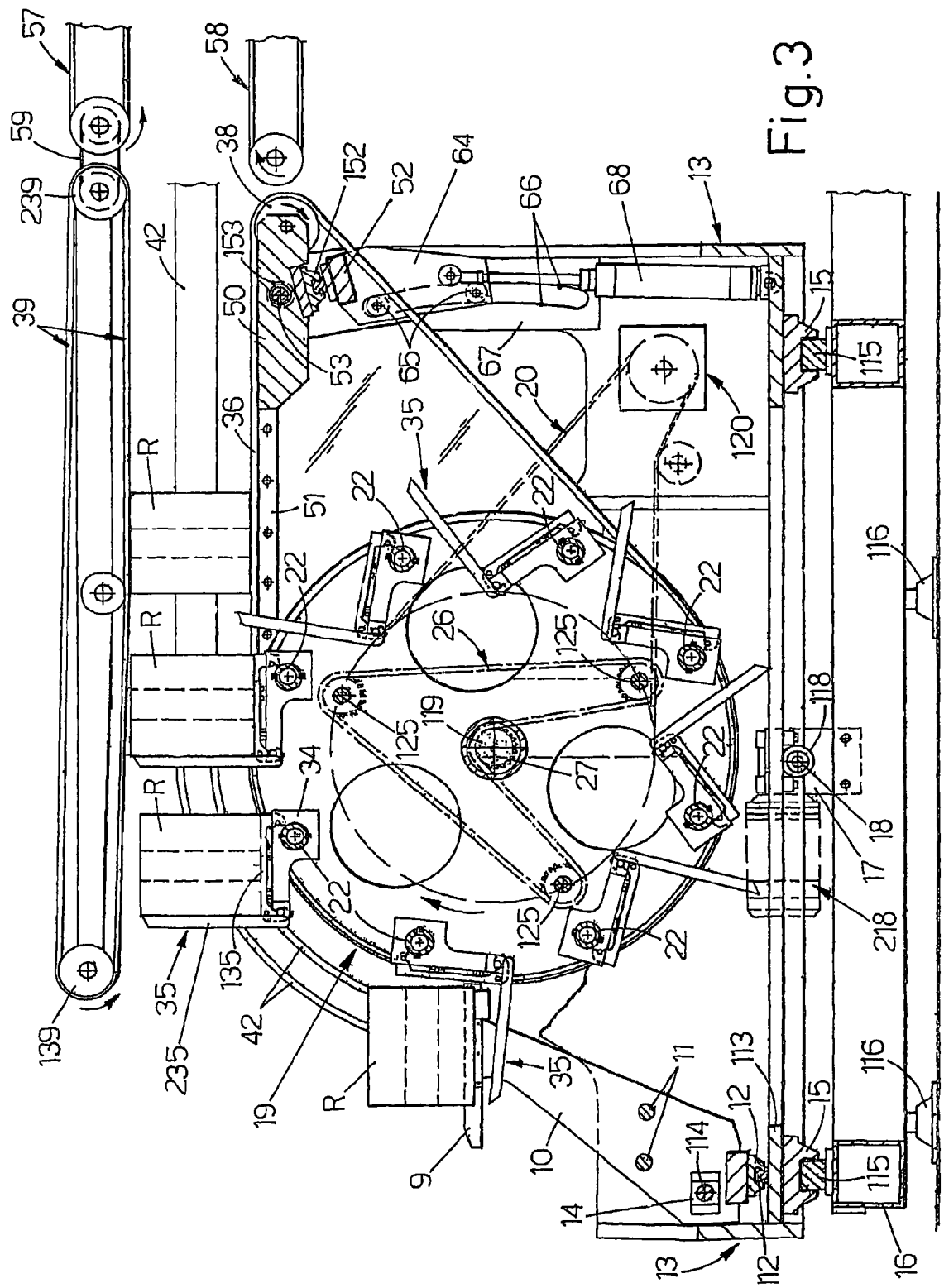

For this purpose, as shown in FIGS. 1 and 3, in one embodiment the bottom of bed frame 13 is provided with rectilinear and transverse slides 15 that slide on guides 115 fixed on a bed 16, which rests on the floor with adjustable feet 116 and on one side of which a bracket 17 is fixed. Said bracket 17 rotatably supports an adjustment screw 18 co-operating with a nut screw 118, fixed with respect to the bottom of the frame 13, and actuated by a drive assembly 218 with a motor having two directions of rotation. Said motor is controlled by a control unit of the machine, such as a processor, in order to enable the frame 13 to be pre-arranged upon command in the condition illustrated in FIG. 2a or FIG. 2b alternatively.

Provided downstream of the arms 10 with the interchangeable supports 9 is arranged said carousel 19. The carousel 19 has an axial shaft 119, which is set horizontal and orthogonal to said supports 9 and rotatably supported by the side walls 213, 213' of the frame 13. The shaft 119 is made to rotate with a continuous movement in the clockwise direction as viewed in FIGS. 3 and 4 by a positive belt and toothed-pulley transmission 20 and by a the motor 120 preferably of the type with electronic control of the speed and of the phase.

In one embodiment the carousel 19 comprises two end or side-wall disks 21, 121, of equal diameter, which are fitted to the shaft 119 of said carousel. Peripheral means with low coefficient of friction provided on said disks 21, 121, rotatably support the ends of a plurality of shafts 22. In the example shown said shafts 22 are eight in number, but it should be understood that the number of said shaft can vary according to the requirements and design. Said shafts 22 are parallel to the shaft 119 of said carousel 19 and are set at equal angular distances apart from one another.

Mounted in the space comprised between said two side-wall disks 21, 121 are pairs of parallel and equal disks 23, 23', 23'', 23''', as shown in FIG. 6. The two disks 23, 23', 23'', 23''' of each pair are fixed together by means of internal spacers 24 and are provided with an axial bushing 123 supporting said pairs of disks on the shaft 119 of the carousel 19, such that each pair of disks can slide on the shaft 119 of the carousel 19. Furthermore, each disk 23, 23', 23'', 23''' is provided with peripheral bushings 223, through which said shafts 22 pass, such that said disks can slide along said shafts 22.

Since said pairs of intermediate disks 23, 23', 23'', 23''' must be centered with said pairs of supports 9, each said pair of disks is equipped with a set of nut screws 25. In the example shown there are three such nut screws 25 for each disk. In one embodiment, said nut screws are set at angular distances apart from one another. In one embodiment, said nut screws are arranged at equal distances from the shaft 119.

Said nut screws 25 co-operate with corresponding screws 125, which are rotatably supported by the side-wall disks 21, 121. Said screws 125 have right-hand and left-hand threads. In one embodiment, said right-hand and left-hand threads have differentiated pitches. Said right-hand and left-hand threads co-operate with said nut screws 25 to produce the necessary mutual self-centering displacement between the pairs of intermediate disks 23, 23', 23'', 23'''.

One end of each screw 125 projects from the disk 21 that is opposite to the one from which the shaft 119 of the carousel 19 comes out. The projecting ends of said screws are connected by means of a positive transmission of motion 26 with pinion wheels and chain or with toothed pulleys and belt with double toothing, to a toothed pulley or pinion wheel 27 fitted on a bushing 28. Said bushing 28 is mounted so that it can turn on the shaft 119 (FIG. 5). A corresponding toothed pulley or pinion wheel 127 is fitted on said bushing 29. By means of a positive transmission of motion 227, said pinion wheel 127 is connected to the output shaft 129 of an epicyclic reducer 29, the input shaft 229 and output shaft 129 of which are supported rotatably by supports 30 fixed to the nearby side wall 213 of the frame of the carousel. The body of the epicyclic reducer 29 receives the motion of rotation from the shaft 119 of the carousel 19, through a positive transmission of motion 31, whilst the input shaft 229 of said reducer 29 is connected in 132 to a positive transmission 32, kinematically connected to a motor reducer 33 with an electric motor with electronic control of the speed and phase and having two directions of rotation.

Figure 4:
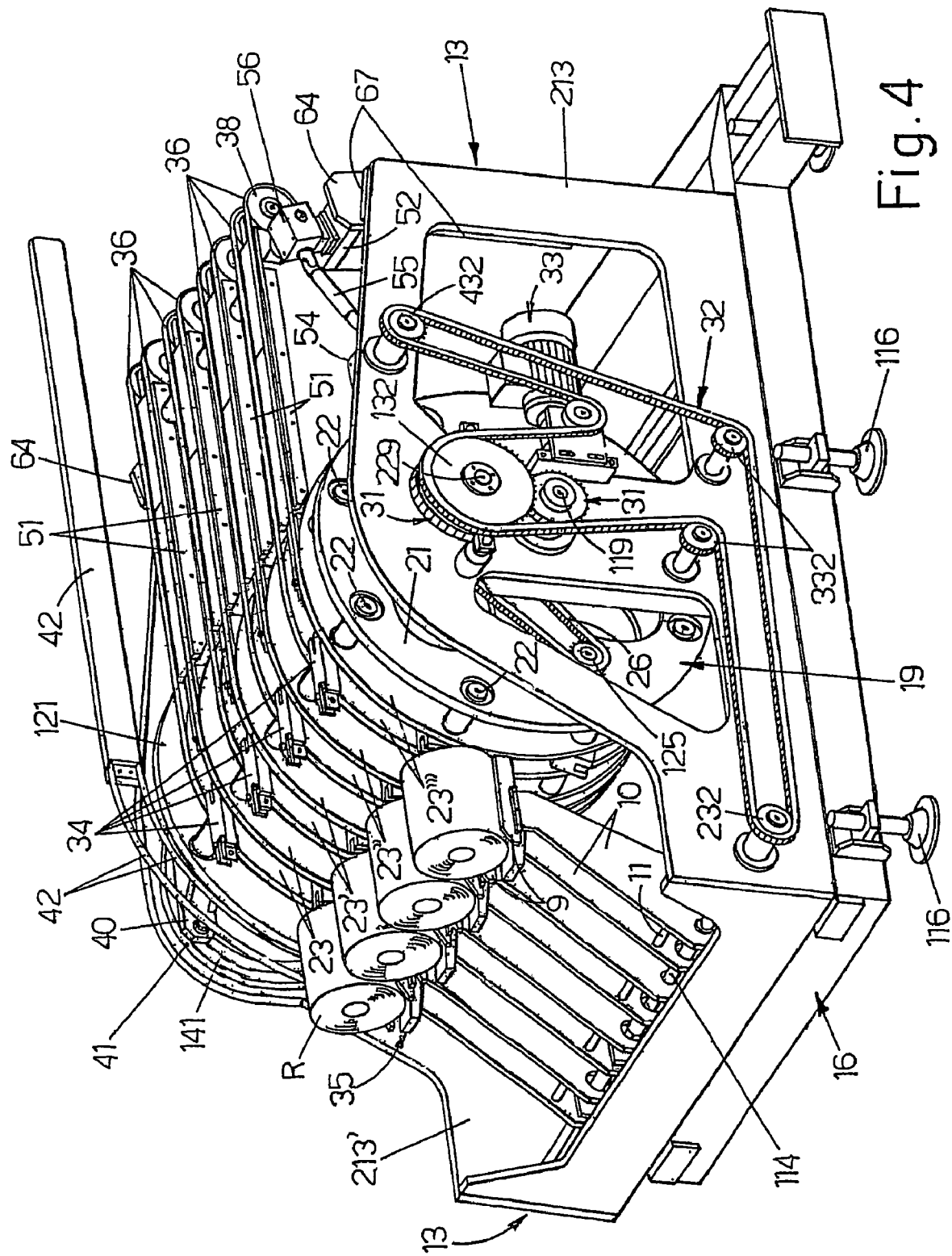

From FIG. 4 it may be noted that said transmission 32 is connected in 232 to said composite screw 114, which adjusts the distance between the pairs of arms 10 and supports 9. In the same FIG. 4, designated by 332 are return idlers of the transmission of motion 32 referred to previously, whilst designated by 432 is a derivation of motion from said transmission 32, described in greater detail later on.

As can be understood from what has just been described with reference to FIGS. 3, 4 and 5, through the motor assembly 33 it is possible to actuate both the screw 114 and the screws 125 for self-centring adjustment of the distance between the pairs of disks 23 to 23''' in so far as the rotation of adjustment enters, in 229, the reducer 29, exits from the shaft 129 and, through the transmission 227, reaches the kinematic chain 28, 127, 27 and 26 and acts on the screws 125.

When the carousel 19 starts to turn around its horizontal axis and the motor assembly 33 is stationary, the input shaft 229 of the epicyclic reducer 29 is also stationary, whilst the body of said epicyclic reducer is brought into rotation by the shaft 119 of the carousel through the transmission of motion 31. Therefore, the output shaft 129 of the reducer 29 is actuated with a speed of rotation and in a direction such that the complex 127 and 27 connected thereto through the transmission 227 rotates in the same direction and at the same speed as the shaft 119 of the carousel, as if it were fitted to said shaft 119. Consequently the transmission of motion 26 remains stationary and the screws 125 remain stationary in the angular position into which they were brought in the preceding step of adjustment and adaptation to the format of the rolls R to be treated.

From FIGS. 2 to 5 it may be noted that the shafts 22 are equipped with a pair of longitudinal grooves 122, in which keys 134 of levers 34 slide (see also FIGS. 7 and 8). Said levers 34 are fitted on said shafts and are arranged in the space between the disks 23 to 23''' of each said pairs of disks. Said levers 34 are oriented in the direction opposite to the direction of rotation of the carousel 19.

On each lever 34 a corresponding L-shaped stall 35 can be mounted. The levers 34 are arranged such that said stalls can be easily and rapidly mounted and replaced as the format of the rolls to be treated changes (as will be described hereinafter). Said stalls are L-shaped. Each stall 35 has a base 135 which, when the stall 35 is mounted on the corresponding lever 34, rests on said lever 34. Furthermore each stall 35 is provided with a blade 235. The stalls are mounted on the levers 34 such that when the stall is set on the end that juts out further of the corresponding lever 34, said stall is open in the direction of rotation of the carousel 19. Thus when the carousel rotates each stall is able to travel with its blade 235 between a pair of supports 9, to pick up the roll thereon, which is fed on said supports in the right phase as disclosed hereinabove.

As illustrated in the sequence of FIG. 3, each stall 35 arrives with its blade 235 underneath the roll R which is placed stationary on the rests 9. The stall 35 has a slight inclination that brings the front base of the roll to rest against the base 135 of the stall, and, in the subsequent rotation upwards, the blade of the stall takes a vertical position and remains in such position as long as the roll R, which is in a vertical position as well, is properly inserted between a pair of horizontal conveyors, set above one another and motor-driven.

The active portion of the lower one of said conveyors is formed by the top branch of pairs of belts 36 entrained in grooves 37 (FIG. 6) of the pairs of disks 23 to 23''' and thus driven by the carousel 19. Said top branches of said belts 36 are further entrained about pairs of corresponding idle pulleys 38 described in greater detail later on. The top conveyor 39 is also formed by pairs of parallel belts, which are run over the shafts 139, 239 and motor-driven so as to travel with the bottom branch in the same direction and at the same speed as the top branch of said belts 36. According to a preferred embodiment, the belts 36 and 39 are made of a suitable elastomeric material.

By appropriate adjustment means said top conveyor 39 is height-adjustable. The distance between the belts forming said conveyor 39 is also adjustable for adaptation to the various formats of rolls to be treated, as has been said for the pairs of supports 9 and for the pairs of disks 23 to 23'''.

In one embodiment, as illustrated in FIG. 3, the first stretch of the bottom branch of the top conveyor 39 is slightly inclined so as to prevent any undesirable interference with the roll that is being raised and inserted by the stalls 35.

After the roll has been properly inserted between the motor-driven conveyors 36 and 39, the stall 35 is caused to oscillate such as to move away from the roll without its blade 235 interfering with the rolls that proceed between said conveyors 36 and 39 as the carousel 19 continues to turn. Afterwards said stalls are temporarily withheld in the resting position and then are gradually prearranged for a new co-operation with the pairs of supports 9 in order to repeat the cycle described.

From FIGS. 2, 4 and 5 it may be noted that the shafts 22 that control the oscillation of the stalls project with one of their ends from the side-wall disk 121 of the carousel 19. On said projecting end of each shaft 22 a respective lever 40 is fitted. Said lever terminates with end rollers 140. Said rollers 140 act as followers on a double-acting profile 141 of a cam 41 fixed to the nearby side wall 213' of the bed of the carousel. The profile of the cam 41 controls the previously described oscillations of the stalls 35 for transferring the rolls from the horizontal position where they are resting on the supports 9 to a vertical position between the conveyors 36 and 39.

Designated by 42 in FIGS. 2 and 4 are the format-adjustable side walls, which laterally guide the group of rolls, which is cyclically raised and rotated by the stalls 35 and which travels between the conveyors 36 and 39.

From FIGS. 7 and 8 it may be noted that, according to a preferred embodiment of the invention, the levers 34 are provided at the opposite ends with pins 43 and 44, the first of which is uncovered in an intermediate area on which a fixed end hook 335 of the base 135 of the stall anchors. On the other end, said base has side projections 435 that rest on the free ends of the other pin 44, which is also free in an intermediate portion. A lever 45 engages by snap action with a nose 145 thereof on said intermediate portion of pin 44. Said lever 45 is hinged in 245 to said base 135 and is pushed into the setting position by a leaf spring 46 fixed, at the bottom, to said base 135. Designated by 47 is a pin which defines the end position of the counterclockwise rotation of the lever 45, whilst designated by 48 are two small spring-operated dampers set on the lever 34. Said dampers co-operate with the base 135 of the stall in order to prevent any play when the latter is engaged with the lever 45 to the pin 44.

By exerting thrust on the lever arm 345 of the lever 45, it is possible to disengage said lever from the pin 44 and remove the stall to replace it with another stall adapted to the format of rolls to be treated. The sets of stalls used according to the different formats of the rolls differ from one, another substantially as regards the length and/or the shape of the blades 235, which may, for example, have a U-shaped cross section and may terminate with one end open at the front and equipped with sides, which is set on the T-shaped head 535 of the base 135, said head 535 being provided with holes, which line up with corresponding side holes of said end of the blade and in which it is possible to insert coupling pins 49.

From FIGS. 2, 3 and 4 it may be noted that the pairs of pulleys 38, over which the pairs of belts 36 are run, are supported by respective supports 50. At the sides of said supports 50 are guides 51 that support the top branches of the belts 36. Furthermore said supports 50 carry, fixed at the bottom thereof, transverse slides 152 that slide on a rectilinear guide 52, which for the moment is assumed as being fixed with the ends to the side walls 213, 213' of the bed frame 13 of the carousel. Fixed on the ends of the guide 52 are supports that rotatably support the ends of a screw 53 parallel to said guide 52. Said screw has right-hand and left-hand threads. In a preferred embodiment said threads have differentiated pitches. Said threads co-operate with corresponding nut screws 153 fixed with respect to the supports 50.

With this arrangement, by acting on said screw 53 it is possible to transmit to the pulleys 38 the same self-centering movement of adjustment of the distance apart that is transmitted to the pairs of disks 23 to 23''' of the carousel 19. For this purpose, the offtake 432 shown in FIG. 4 acts on an angular transmission of motion 54, which is fixed to the side wall 213 and which, via a telescopic transmission shaft 55 and with universal joints at the ends, actuates another angular transmission of motion 56 fixed on one end of the guide 52 and connected kinematically to said adjustment screw 53.

As can be seen in FIGS. 1 and 3, single rolls or pre-packaged packs of rolls exit from the conveyors 36 and 39 said rolls or packs of rolls are arranged side-by-side in the right number, set with their axis vertically and at equal distances apart from one another with the pitch generated by the distance between the stalls 35 of the carousel 19.

The products that come off the conveyors 36 and 39 can be fed to any processing device, for which such a cadenced feed of vertically oriented rolls is required.

If the rolls are to be fed to a continuous and high-speed bag-filling machine, said rolls that come off the conveyors 36 and 39 are fed to at least one dosing device of any suitable type, which groups them together even one after the other and in the right phase feeds them to said bag-filling machine.

The dosing device can be of any type suitable for this purpose, for example, of the type that is now illustrated with reference to FIG. 1. A device of this kind is disclosed in EP-A-1,666,360, the content of which is entirely incorporated herein by reference. The dosing device includes a first pair of horizontal conveyors 57 and 58, which are set above one another and parallel to one another. Said conveyors 57 and 58 can be for example, belt conveyors. They are driven by respective motors 157 and 158 so as to travel with their internal branches in the same direction and at the same speed as the conveyors 36 and 39 set upstream. In this way the rolls R will pass from one pair of conveyors to another without any relative movement or any sliding and always properly controlled.

For this purpose, the area where the conveyors 39 and 57 meet up with one another is staggered with respect to the bottom corresponding area of the conveyors 36 and 58. The conveyor 39 derives, for example, its motion from the conveyor 57 through a positive transmission of motion 59. Provided downstream and in coplanar alignment with the conveyors 57, 58 set above one another and at the right distance from the latter is another pair of similar conveyors 57' and 58' with corresponding motors 157' and 158'. Said further pair of conveyors move at the same speed and in the same direction of advance as the products. Between these two pairs of conveyors the proper dosing device is arranged.

Said dosing device comprises a pair of conveyors 60, 60', which may be belt conveyors and/or roller conveyors or conveyors of an equivalent type, set above one another and with corresponding motor drives 160, 160'. Said conveyors 60, 60', with their internal branches, are set in the same plane as and spanning the conveyors 58, 58' and 57, 57', which move upon command in the same direction and at the same speed. Between said conveyors 60, 60' and the conveyors set upstream and downstream there is provided a sufficient distance for passage of one of the cross members 62, 62' of pairs of toothed-belt or chain positive conveyors 61, 61', with corresponding motor drives 161, 161'. Said motor drives are electrically connected to one another, so that said cross members can travel in synchronism in the space between said conveyors 60, 60', in the same direction of advance as the products and according to the law described in what follows.

At the start of each cycle, a pair of cross members 62, 62' is stationary in a position corresponding to the initial portion of the intermediate conveyors 60, 60', which are also stationary, so as to arrest the flow of the products R fed by the conveyors 57 and 58. In such way said products accumulate between these conveyors without being damaged by rubbing against the latter. Once formation of the pre-set group of products between the conveyors 57, 58 set upstream is completed, the intermediate conveyors 60, 60' and 61, 61' are activated so that the conveyors 61, 61' remove the front cross members 62, 62' and the conveyors 60, 60' contribute to the transfer of said group of products from the conveyors 57, 58 set upstream to the ones 57', 58' set downstream, which advance in the same direction and at the same speed.

In this step, according to the length of the group of products to be transferred, the conveyors 61, 61' are actuated with the right ramps of deceleration and then of possible acceleration in such a way that, when said group of products is about to pass beyond the areas of conjunction between the conveyors 58, 60 and 57, 60', a first pair of cross members 62, 62' is positioned in the rear part of said group of products and accompanies it in the unloading movement between the conveyors 57', 58' set downstream, whilst a second pair of cross members 62, 62' moves in front of the product that follows the group of products that has been unloaded and stops in the initial part of said intermediate conveyors 60, 60', to arrest said product that follows and to enable formation of a new group of products, as mentioned previously. As the format of the products varies, appropriate means (not shown) are provided for adjusting the height of the upper conveyors 39, 57, 57', 60', 61' and to adjust also the position of side walls (not shown), which guide the flow of products longitudinally.

As shown in FIG. 1 with a dashed line, the device as described is suited also for enabling feeding to the bag-filing machine, through the dosing device described with is the cross members 62, 62', large packaged packs of products grouped together, coming from an inclined feed conveyor 63, which is made to meet up with the initial part of the conveyor 58, instead of the conveyor 36. Said conveyor 36 is made to oscillate downwards as will be described later on, whilst the carousel 19 remains stationary and at least the upper stalls 35 are removed from the carousel 19. These stalls would otherwise interfere with the inclined conveyor 63.

The upper conveyor 39 is inclined in the position indicated with a dashed line and designated by 39' and is appropriately raised together with the upper conveyor 57, which can also be inclined upwards once again with an oscillation on the motor drive shaft so that the new flow of products coming from the conveyor 63 will advance towards the doser only by the action of the bottom conveyors 63 and 58.

From FIGS. 2 and 3 it may be noted that the guide 52 that had before been assumed as being supported by the side walls of the bed frame 13 of the carousel, is in actual fact fixed with its ends to a pair of supporting plates 64, which extend downwards. Said plates 64 support, each on the outer side, at least one pair of rollers 65. Said rollers are guided within slots shaped like the sectors of a circle 66 provided on plates 67 which are fixed to the side walls 213, 213' of the frame 13. Said slots 66 have a curvature with the center on the axis of the shaft 119 of the carousel 19. Rectilinear actuators 68, such as, for example, fluid-pressure cylinder-and-piston assemblies or electromechanical jacks, are provided in connection with the plates 64 and with the bed 13 in order to keep the complex of the belt conveyors 36 with the top branch horizontal, in the active position indicated in FIG. 3 with a solid line, or in order to lower said complex 36 into the resting position indicated with a dashed line in FIG. 3.

It remains understood that the description refers to a preferred embodiment of the invention, to which numerous constructional variations and modifications can be made, without thereby departing from the concept underlying the invention, as set forth above, and as is defined and claimed hereinafter. In the claims, the references appearing in brackets are purely indicative and in no way limit the scope of protection of the claims.

The invention claimed is:

1. A device for forming a continuous and cadenced flow of a plurality of products, comprising an advancement conveyor for feeding said products; downstream of said advancement conveyor, a carousel rotating on a substantially horizontal rotation shaft; an exit conveyor for receiving said products from said carousel; wherein said carousel comprises a plurality of L-shaped stalls with each of said stalls including a blade arranged to cyclically pass between corresponding supports on which said products are fed by said advancement conveyor in order to lift said products from said supports, rotate said products and feed said products to said exit conveyor; wherein said L-shaped stalls are pivotally mounted on said carousel; wherein said L-shaped stalls are subject to a controlled oscillation with respect to said carousel such that, when said products are in a vertical position on said exit conveyor, the L-shaped stalls are caused to oscillate backwards with respect to the carousel; wherein said exit conveyor includes a pair of substantially parallel and horizontal conveyors arranged one on top of another in superposed relation such that the products are fed between said pair of conveyors which are in superposed relation and advance in contact therewith; wherein said carousel further comprises two side-wall disks which are fitted on said rotation shaft, said rotation shaft being rotatably supported by side walls of a bed frame and structured to rotate with continuous movement by a positive transmission and by an electric motor; wherein said side-wall disks rotatably support ends of a plurality of peripheral shafts arranged in parallel to said rotation shaft of said carousel, said peripheral shafts being set at equal angular distances apart from one another and supporting said L-shaped stalls; and wherein in a space between a pair of said side-wall disks are arranged a pair of parallel and equal intermediate disks, said intermediate disks are slidable on said rotation shaft of said carousel and slide on said peripheral shafts.

2. The device according to claim 1, wherein each pair of said intermediate disks are centered with a respective pair of supports, each pair of said intermediate disks being equipped with nut screws which cooperate with corresponding screws rotatably supported by said side-wall disks and equipped with opposite threads to produce a mutual self-centering displacement between said intermediate disks.

3. The device according to claim 2, wherein said screws engaging with said nut screws of said intermediate disks project at one end thereof from one of said side-wall disks, said one end of said screws being connected to an adjustable actuator.

4. A device for forming a continuous and cadenced flow of a plurality of products, comprising an advancement conveyor for feeding said products; downstream of said advancement conveyor, a carousel rotating on a substantially horizontal rotation shaft; an exit conveyor for receiving said products from said carousel; wherein said carousel comprises a plurality of L-shaped stalls with each of said stalls including a blade arranged to cyclically pass between corresponding supports on which said products are fed by said advancement conveyor in order to lift said products from said supports, rotate said products and feed said products to said exit conveyor; wherein said L-shaped stalls are pivotally mounted on said carousel; wherein said L-shaped stalls are subject to a controlled oscillation with respect to said carousel such that, when said products are in a vertical position on said exit conveyor, the L-shaped stalls are caused to oscillate backwards with respect to the carousel; wherein said exit conveyor includes a pair of substantially parallel and horizontal conveyors arranged one on top of another in superposed relation such that the products are fed between said pair of conveyors which are in superposed relation and advance in contact therewith; wherein said carousel further comprises two side-wall disks which are fitted on said rotation shaft, said rotation shaft being rotatably supported by side walls of a bed frame and structured to rotate with continuous movement by a positive transmission and by an electric motor; wherein said side-wall disks rotatably support ends of a plurality of peripheral shafts arranged in parallel to said rotation shaft of said carousel, said peripheral shafts being set at equal angular distances apart from one another and supporting said L-shaped stalls; and wherein said peripheral shafts of the carousel include longitudinal grooves in which keys slide, said keys being of levers fitted on said peripheral shafts and being in an internal space of each pair of said side-wall disks, and wherein said levers are oriented in a direction opposite to direction of rotation of the carousel including said L-shaped stalls.

5. The device according to claim 4, wherein said L-shaped stalls are mounted on said levers so as to rest a base thereof on a corresponding lever, wherein a blade projects from said lever so that said L-shaped stalls are open in the direction of rotation of the carousel so that the blade travels between said pairs of supports in order to pick up one of said products that is placed on said supports.

6. The device according to claim 5, wherein said L-shaped stalls include a snap-fitting device for connection to said levers.

7. The device according to claim 6, further including a dosing device arranged downstream of said carousel.

8. The device according claim 7, wherein said dosing device is structured to collect the products cadenced and arranged alongside one another that come off said exit conveyor, so that said products exit from said dosing device grouped together so as to be arranged alongside one another and set one after another, in a pre-determined number as necessary for feeding in phase a continuous and high-productivity machine.

9. The device according to claim 7, wherein said dosing device comprises a first pair of horizontal conveyors, set above one another and parallel to each other, driven by respective motors so as to move with internal branches thereof in a common direction and at a common speed as conveyors set upstream thereto, so that the products pass from one pair of conveyors to another pair of conveyors without any relative sliding and movement, so that an area where said first pair of horizontal conveyors meet one another is staggered with respect to a top one and a bottom one of the first pair of horizontal conveyors, there being provided downstream of and in co-planar alignment with said first pair of horizontal conveyors and at a distance one from another, a second pair of equal and motor-driven conveyors which move at a common speed and in a common direction of advance as the products and in a space between the first pair of conveyors and the second pair of conveyors to provide the dosing device which comprises a pair of conveyors set one above another with corresponding motor drives which, with the internal branches thereof, are set in a common plane with and spanning said conveyors and which move upon command in the common direction and at the common speed, wherein between conveyors upstream and downstream, a distance is present sufficient for passage of a push cross member of pairs of positive chain conveyors with corresponding motor drives electrically connected to one another so that said push cross member travels in synchronism in a space between said conveyors in the common direction of advance as the products and so as to form longitudinal groups of products.

10. The device according to claim 9, further comprising means to cause a start of each cycle a pair of push cross members to be stationary in a position corresponding to an initial part of intermediate conveyors which are also stationary so as to arrest flow of the products fed by conveyors set upstream, so that said products accumulate between these conveyors, without being damaged by sliding thereagainst so that once a pre-determined group of products is formed between conveyors set upstream, the intermediate conveyors are activated so that such removes the front push cross members and spanning conveyors contribute to transferring said group of products from the conveyors set upstream to ones set downstream that advance in the common direction and at the common speed, wherein conveyors with the push cross members are actuated with ramps of deceleration and acceleration in such a way that when said group of products is about to pass beyond an area between the conveyors set upstream and the intermediate conveyors, a first pair of the push cross members is set in a rear part of said group of products and accompanies the products in unloading between conveyors set downstream, while a second pair of the push cross members inserts itself in front of a product that follows the group of products that have been unloaded and stops in an initial part of said intermediate conveyors in order to arrest said product that follows and to enable formation of a new group of products.

11. The device according to claim 10, further comprising means to enable all top conveyors to be height-adjusted, and means to enable adjustment of position of the side walls that guide flow of the products.

12. A device for forming a continuous and cadenced flow of a plurality of products, comprising an advancement conveyor for feeding said products; downstream of said advancement conveyor, a carousel rotating on a substantially horizontal rotation shaft; an exit conveyor for receiving said products from said carousel; wherein said carousel comprises seats for receiving said products fed by said advancement conveyor in order to lift said products, rotate said products and feed said products to said exit conveyor; wherein said seats are pivotally mounted on said carousel and subject to a controlled oscillation with respect to said carousel such that, when said products are in a vertical position on said exit conveyor, the seats are caused to oscillate with respect to said carousel in a direction opposite to a direction of rotation of said carousel, wherein said exit conveyor includes top branches of pairs of conveyor belts which run over a circumference of said carousel and over parallel pulleys located downstream of said carousel; pairs of supports for said products arranged between said advancement conveyor and said carousel to receive said products from said advancement conveyor, said seats passing through said pairs of supports to lift said products from said supports; a cam profile around an axis of rotation of said carousel and followers connected to said seats, wherein rotation of said carousel causes said followers to move along said cam profile, thus causing oscillation of said seats with respect to said carousel; wherein said seats are arranged on said carousel according to a plurality of circumferentially distributed sets of seats, said sets of seats being arranged side by side along a rotation axis of said carousel; and wherein distance between said circumferentially distributed sets of seats is adjustable.

13. The device according to claim 12, wherein the seats of said circumferentially distributed sets of seats are axially aligned along directions parallel to the axis of rotation of said carousel.

14. The device according to claim 13, wherein the seats, which are axially aligned, are connected to a common oscillation shaft, wherein oscillation of each said common oscillation shaft is controlled by a respective cam follower, said cam follower co-acting with a cam profile around the rotation axis of said carousel.

15. The device according to claim 12, wherein said carousel is adjustable transversely with respect to said advancement conveyor.

16. The device according to claim 15, wherein said exit conveyor is adjustable transversely with respect to said advancement conveyor.

17. The device according to claim 12, wherein distance between said pairs of supports is adjustable.

18. The device according to claim 12, wherein said pairs of supports are adjustable transversely with respect to said advancement conveyor.

19. The device according to claim 18, wherein said pairs of supports and said carousel are arranged on a common frame, said common frame being adjustable transversely with respect to said advancement conveyor.

20. The device according to claim 12, wherein said seats are interchangeable to accommodate different formats of said products.

21. The device according to claim 12, wherein said pairs of supports are interchangeable to accommodate different formats of said products.

22. The device according to claim 12, wherein length of said advancement conveyor is adjustable to accommodate different formats of said products.

23. The device according to claim 12, wherein said advancement conveyor includes a plurality of lateral guides which define a plurality of product advancing channels, wherein said advancing channels converge towards a central line of said advancement conveyor.

24. A device for forming a continuous and cadenced flow of a plurality of products, comprising an advancement conveyor for feeding said products; downstream of said advancement conveyor, a carousel rotating on a substantially horizontal rotation shaft; an exit conveyor for receiving said products from said carousel; wherein said carousel comprises a plurality of L-shaped stalls with each of said stalls including a blade arranged to cyclically pass between corresponding supports on which said products are fed by said advancement conveyor in order to lift said products from said supports, rotate said products and feed said products to said exit conveyor; wherein said L-shaped stalls are pivotally mounted on said carousel; wherein said L-shaped stalls are subject to a controlled oscillation with respect to said carousel such that, when said products are in a vertical position on said exit conveyor, the L-shaped stalls are caused to oscillate backwards with respect to the carousel; wherein said exit conveyor includes a pair of substantially parallel and horizontal conveyors arranged one on top of another in superposed relation such that the products are fed between said pair of conveyors which are in superposed relation and advance in contact therewith; wherein said carousel comprises two side-wall disks fitted on a rotation shaft; wherein said side-wall disks support a plurality of peripheral shafts arranged in parallel to said rotation shaft of the carousel; wherein in a space between said side-wall disks are arranged at least a pair of intermediate disks, said intermediate disks being slidable on said rotation shaft of the carousel; and wherein a plurality of stalls are peripherally arranged around said rotation shaft and between said at least one pair of intermediate disks.

25. The device according to claim 24, wherein between said side-wall disks a plurality of pairs of intermediate disks are arranged, slidable on said rotation shaft of the carousel; and wherein a plurality of stalls are peripherally arranged around said rotation shaft and between each pair of intermediate disks.

26. A device for forming a continuous and cadenced flow of a plurality of products, comprising an advancement conveyor for feeding said products; downstream of said advancement conveyor, a carousel rotating on a substantially horizontal rotation shaft; an exit conveyor for receiving said products from said carousel; wherein said carousel comprises seats for receiving said products fed by said advancement conveyor in order to lift said products, rotate said products and feed said products to said exit conveyor; wherein said seats are pivotally mounted on said carousel and subject to a controlled oscillation with respect to said carousel such that, when said products are in a vertical position on said exit conveyor, the seats are caused to oscillate with respect to said carousel in a direction opposite to a direction of rotation of said carousel, wherein said exit conveyor includes top branches of pairs of conveyor belts which run over a circumference of said carousel and over parallel pulleys located downstream of said carousel; pairs of supports for said products arranged between said advancement conveyor and said carousel to receive said products from said advancement conveyor, said seats passing through said pairs of supports to lift said products from said supports; a cam profile around an axis of rotation of said carousel and followers connected to said seats, wherein rotation of said carousel causes said followers to move along said cam profile, thus causing oscillation of said seats with respect to said carousel; wherein said seats are arranged on said carousel according to a plurality of circumferentially distributed sets of seats, said sets of seats being arranged side by side along a rotation axis of said carousel; and wherein distance between said pairs of supports and distance between said sets of seats are adjustable by a common actuator.

* * * * *